United States Patent

Huang et al.

(10) Patent No.: US 9,866,257 B2
(45) Date of Patent: Jan. 9, 2018

(54) XDSL AND G.FAST SFP FOR ANY-PHY PLATFORM

(71) Applicant: Metanoia Communications Inc., Hsinchu (TW)

(72) Inventors: Liang-Cheng Huang, Hsinchu (TW); Yi-Tsen Kuo, Hsinchu (TW); Jhai-Ping Syu, Hsinchu (TW)

(73) Assignee: METANOIA COMMUNICATIONS INC., Hsinchu (TW)

( * ) Notice: Subject to any disclaimer, the term of this patent is extended or adjusted under 35 U.S.C. 154(b) by 0 days.

(21) Appl. No.: 15/041,152

(22) Filed: Feb. 11, 2016

(65) Prior Publication Data

US 2016/0241293 A1    Aug. 18, 2016

Related U.S. Application Data

(60) Provisional application No. 62/115,351, filed on Feb. 12, 2015.

(51) Int. Cl.
*H04B 1/38* (2015.01)
*H04B 1/40* (2015.01)
*G06F 9/44* (2006.01)

(52) U.S. Cl.
CPC ............ *H04B 1/40* (2013.01); *G06F 9/4408* (2013.01); *G06F 9/4416* (2013.01)

(58) Field of Classification Search
CPC . H04B 1/40; H04B 1/401; H04B 1/44; H04B 1/52; H04B 1/58; H04B 1/581; H04B 1/48

See application file for complete search history.

(56) References Cited

U.S. PATENT DOCUMENTS

| | | | | |
|---|---|---|---|---|
| 2004/0199897 | A1* | 10/2004 | Ghercioiu | G06F 8/61 717/101 |
| 2007/0153823 | A1* | 7/2007 | Wojtowicz | H04B 10/40 370/463 |
| 2011/0055537 | A1* | 3/2011 | Yang | G06F 9/4406 713/2 |
| 2011/0182191 | A1* | 7/2011 | Jackson | H04L 12/2697 370/250 |
| 2012/0275784 | A1* | 11/2012 | Soto | H04B 10/2503 398/38 |
| 2014/0024255 | A1* | 1/2014 | Robitaille | H04B 10/40 439/607.2 |
| 2014/0363171 | A1* | 12/2014 | Tang | H04B 10/40 398/135 |
| 2016/0013864 | A1* | 1/2016 | Rafel Porti | H04Q 11/0067 398/58 |
| 2017/0017484 | A1* | 1/2017 | Elmoalem | G06F 8/65 |

* cited by examiner

*Primary Examiner* — Khanh C Tran
(74) *Attorney, Agent, or Firm* — Han IP Corporation; Andy M. Han

(57) ABSTRACT

A transceiver in the form of an integrated small form-factor pluggable (SFP) module is described. The SFP module may include a processor, a hybrid circuit, a transformer, a RJ45 connector and a SFP connector. The processor may be configured to perform functions as a serializer/deserializer (SerDes), a digital signal processor (DSP), an analog front-end and a line driver. The hybrid circuit may be configured to neutralize signals reflected from a transmit direction to a receive direction. The DSP may be configured to support communication according to a Very-high-bit-rate Digital Subscriber Line (VDSL) technology such as the G.Fast standard.

18 Claims, 7 Drawing Sheets

XDSL AND G.FAST SFP FOR ANY-PHY PLATFORM

CROSS REFERENCE TO RELATED PATENT APPLICATION

The present disclosure claims the priority benefit of U.S. Patent Application Ser. No. 62/115,351, filed on 12 Feb. 2015, which is incorporated by reference in its entirety.

TECHNICAL FIELD

The present disclosure generally relates to the field of digital communication and, more particularly, to an integrated small form-factor pluggable (SFP) transceiver.

BACKGROUND

From the start of the 21st Century, the internet revolution has continuously evolved from traditional voice to providing faster data and video services to the mass. Traditionally, telecommunication operators provide residential users with either voice or data services through their access network. Usually some sort of customer premise equipment (CPE), residential gateway/home gateway (RGW/HGW) and/or set-top box (STB) is/are installed at the user end for one or more end users to receive such services. Due to the rapid evolvement of technologies, telecommunication operators are continuously facing the constant need to upgrade their equipment. Each upgrade cycle requires a redesign and qualification of the equipment, thus adding more cost to the service providers.

SUMMARY

The summary provided below is not intended to identify essential features of the claimed subject matter, nor is it intended for use in determining the scope of the claimed subject matter. Some embodiments of the mechanism, techniques, methods, systems and devices are further described below in the detailed description.

In an age of smart home and cloud services, a popular trend is the "one-box" concept. The present disclosure aims to provide a solution that is future-proof and can sustain for five to ten years due to its simplicity in terms of upgrade in meeting evolving technological trend. Various embodiments of mechanisms, architectures, schemes, systems, methods, techniques and devices pertaining to an integrated SFP transceiver are described herein.

In one aspect, a transceiver may include a SFP module. The SFP module may include a processor, a hybrid circuit, a transformer, a RJ45 connector and a SFP connector. The processor may be configured to perform functions as a serializer/deserializer (SerDes), a digital signal processor (DSP), an analog front-end and a line driver. The hybrid circuit may be configured to neutralize signals reflected from a transmit direction to a receive direction. The DSP may be configured to support communication according to a Very-high-bit-rate Digital Subscriber Line (VDSL) technology such as the G.Fast standard.

In another aspect, a method may involve a processor of a SFP module receiving an input that selects one of a plurality of booting modes as a default booting mode. The method may also involve the processor booting in the default booting mode upon the SFP module being plugged into a host platform.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure.

DETAILED DESCRIPTION OF PREFERRED EMBODIMENTS

Overview

Figure 1:
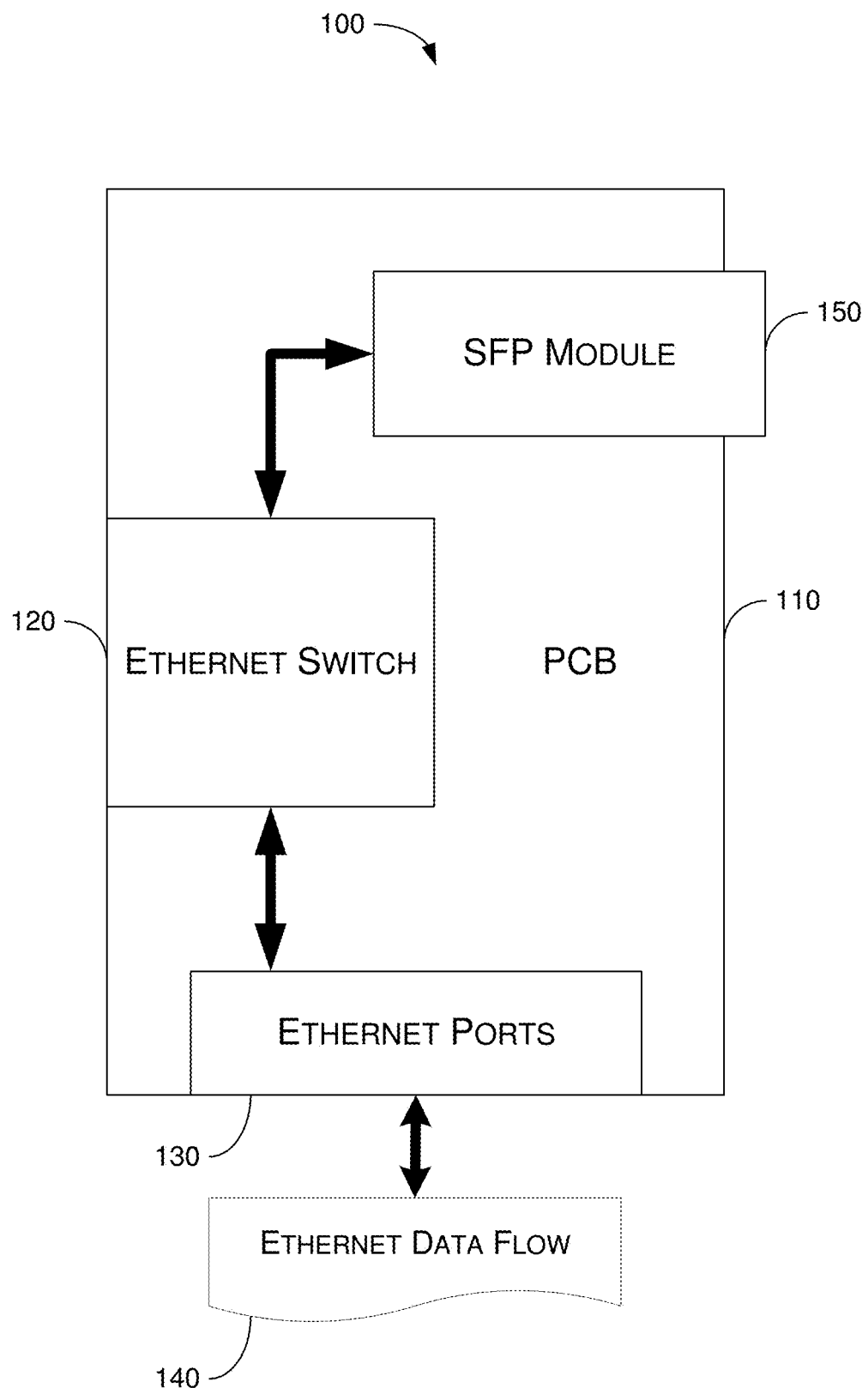
FIG. 1 is a block diagram of an example application scenario of a SFP module in accordance with an embodiment of the present disclosure.

The basic one-box architecture is simple and clear, and may be implemented with a generic platform with a fast network processor and a flexible physical interface that can support the latest renewal transmission technology. Changes to service provider applications and/or logics may be easily maintained and updated in the processor. At the same time, telecommunication operators can upgrade the transmission physical interface separately depending on customer bandwidth request and practical network media deployments (e.g., copper, fiber or coaxial).

In view of the above, various embodiments of mechanisms, architectures, schemes, systems, methods, techniques and devices pertaining to an integrated SFP transceiver are described herein. SFP is a compact, hot-pluggable transceiver used for both telecommunication and data communication applications. The SFP form factor and electrical interface are specified by a multi-source agreement (MSA). Typically, a SFP interfaces a network device motherboard (of a switch, router, media converter or similar device) to an optical fiber or copper networking cable. It is a popular industry form factor jointly developed and supported by many network component vendors.

Traditional implementation of a Very-high-bit-rate Digital Subscriber Line 2 (VDSL2)/G.Fast transceiver (TRx) on a SFP is usually very difficult. There tends to be lots of overlap with a main board in embedded functions, and this results in inefficiency and waste. Besides, extra memory and more power are usually necessary. Embodiments in accordance with the present disclosure provide an implementable solution to achieve a VDSL2/G.Fast transceiver in the form of a SFP module which can meet the power consumption supported by SFP interface. Embodiments of a SFP in accordance with the present disclosure support VDSL2/G.Fast running on copper, coaxial cable and even power line through smart SFP embedded serial gigabit media-independent interface (SGMII) under the control of the main board.

Besides, a SFP in accordance with the present disclosure may provide not just physical layer transmission but also time of day/network timing reference (ToD/NTR) as well as power feeding functions compatible with the SFP interface.

With pure PHY xDSL chip optimization, the present disclosure provides a VDSL2/G.Fast transceiver solution using SFP without external memory needs. Innovative chip boot procedure through SGMII Ethernet boot and management, implementations in accordance with the present disclosure can save the I2C needs from traditional SFP interface, and still efficiently provide the required manufacture information, vendor code and management information base. New improvements described herein can be compatible with traditional optical SFP modules interfaces as well. Power consumption of the VDSL2/G.Fast SFP module in accordance with the present disclosure is affordable to be provided through traditional SFP specification (e.g., 3.3V/600 mA). This leading-edge compact SFP design makes the flexible medium accessibility for fiber, copper, cable and power-line of any physical layer, or "any-PHY", come true. Traditional CPE architecture can thus be upgradable to accommodate growing bandwidth needs and also be more efficient for green environmental protection.

FIG. 1 illustrates an example application scenario 100 of a SFP module 150 in accordance with an embodiment of the present disclosure. In application scenario 100, SFP module 150 may be plugged into or otherwise communicatively coupled to a mother board 110 which may be, for example, a printed circuit board (PCB). SFP module 150 may be, for example, a swappable broadband access SFP transceiver such as a VDSL2/G.Fast transceiver. For instance, SFP module 150 may be configured to receive, transmit and process data in accordance and in compliance with a number of protocols and technologies such as, for example and not limited thereto, VDSL, VDSL2, G.Fast, fiber optic, Gigabit Ethernet, just to name a few. Mother board 110 may have a communication switch 120 installed thereon. Mother board 110 may also have a number of communication ports 130 installed thereon, and communication ports 130 may be configured to receive and transmit data. For illustrative purpose and not limiting the scope of the present disclosure, communication switch 120 is shown as an Ethernet switch in the example depicted in FIG. 1. Correspondingly, communication ports 130 are shown as Ethernet ports receiving and transmitting Ethernet data flow 140 in the example depicted in FIG. 1.

Example Implementations

Figure 2:
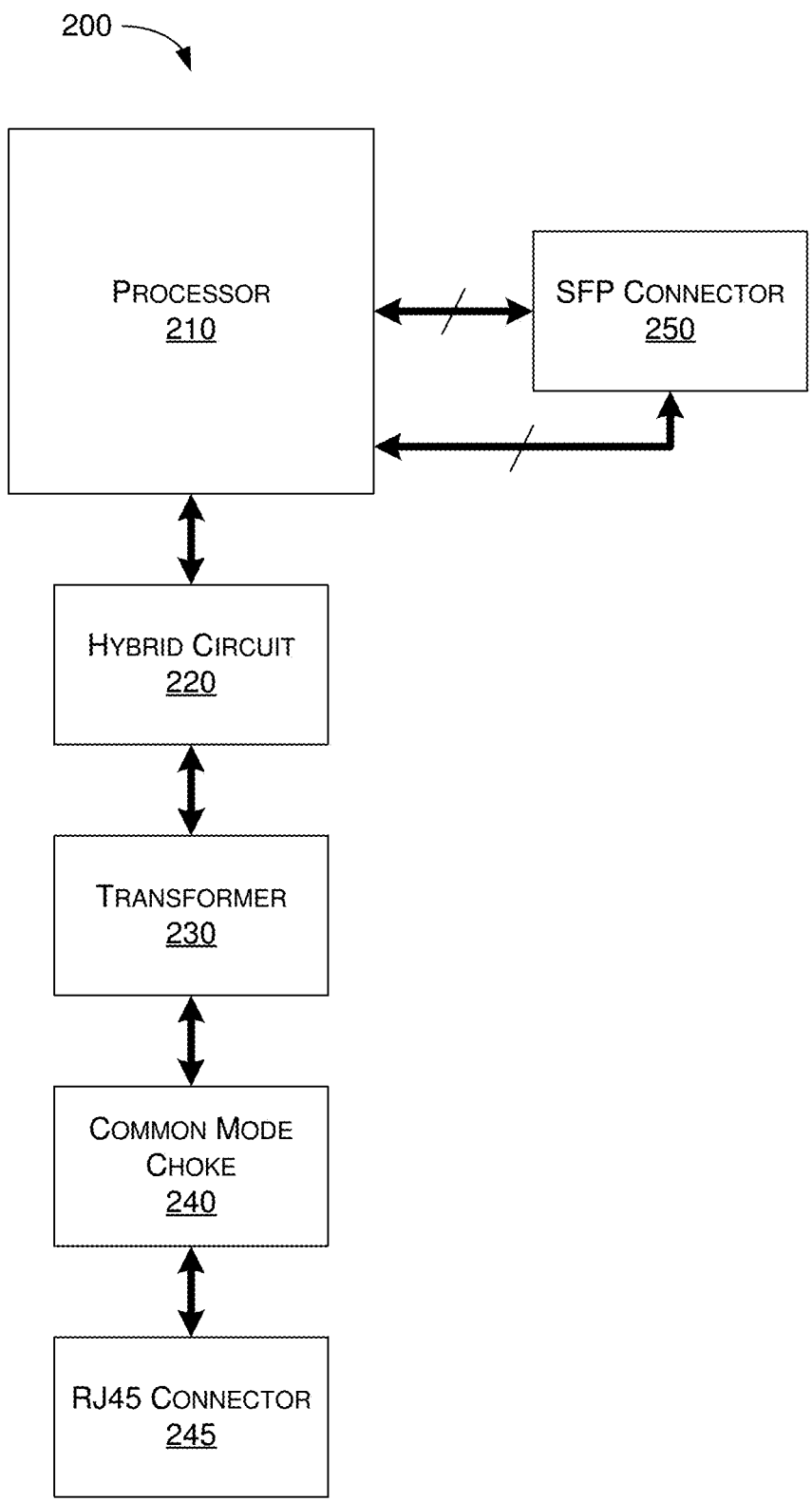
FIG. 2 is a block diagram of an example SFP module architecture in accordance with an embodiment of the present disclosure.

FIG. 2 illustrates an example SFP module architecture 200 in accordance with an embodiment of the present disclosure. Architecture 200 may include at least those components shown in FIG. 2. In the example shown in FIG. 2, architecture 200 includes a processor 210, a hybrid circuit 220, a common mode choke 230, a common mode choke 240, a RJ45 connector 245 and a SFP connector 250. Architecture 200 may include additional components not shown in FIG. 2.

Processor 210 may be a single integrated-circuit (IC) chip or a chipset of multiple IC chips. Processor 210 may be configured with appropriate circuits and logics to execute a number of functions. In some implementations, processor 210 may be configured to function as a serializer and deserializer (SerDes) plus VDSL and/or VDSL2 digital signal processor (DSP), an analog front-end (AFE) and a line driver (LD). Alternatively, processor 210 may be configured to function as a SerDes plus G.Fast DSP, an AFE and a LD. Thus, processor 210 may include a portion configured to function as SerDes plus VDSL/VDSL2 DSP or G.Fast DSP, a portion configured to function as AFE and a portion configured to function as LD.

Processor 210 may include a built-in SerDes interface, which may be configured to transmit and receive Ethernet data between a host platform and processor 210. Processor 210 may be also configured to function as a VDSL/VDSL2/G.Fast modulator and demodulator to convert Ethernet data (received from the SerDes interface) to VDSL/VDSL2 signal and provide the data on a transmission medium (e.g., a twisted-pair copper line), and vice versa.

The LD portion of processor 210 may include a signal amplifier to improve signal strength of the VDSL/VDSL2/G.Fast analog signal.

Processor 210 may also include an integrated memory embedded in the DSP portion thereof, and thus there is no need for an external memory. The embedded memory may be, for example and not limited to, a static random-access memory (SRAM).

Processor 210 may further include a number of power regulators. For instance, processor 210 may include two power regulators with one configured to 3.3V to 5V and the other configured for 3.3V to 1.2V and 1V. In some implementations, the DSP portion, the AFE portion, the LD portion and the power regulators of processor 210 may be provided in a single ball grid array (BGA) package. The dimension of the BGA package may be, for example, 11 mm×15 mm so as to reduce the footprint of the main chipset, and this helps to achieve a target SFP module size of approximately 70 mm.

Hybrid circuit 220 may include a set of circuits configured to neutralized signals (e.g., noise) reflected from the transmit direction to the receive direction, and this minimizes interference with received signals.

Transformer 230 may include a signal conversion component. In some implementations, transformer 230 may include a low-profile transformer in terms of physical dimensions. For example and not limited thereto, the length×width×height dimensions of the low-profile transformer may be 9 mm×8.5 mm×4.5 mm. This compact form factor may allow transformer 230 to fit into a SFP cage. The compact form factor of transformer 230 is a critical feature which allows an overall length of the SFP module to be shortened to a desired dimension, e.g., 70 mm.

Common mode choke 240 may be configured to suppress common noise coming from a twisted-pair copper line. Common mode choke 240 may be physically separate from RJ45 connector 245. Alternatively, common mode choke 240 may be an integral part of RJ45 connector 245.

RJ45 connector 245 may include a twisted-pair copper line connector. In some implementations, RJ45 connector 245 may be a custom RJ45 connector which includes a combination of common mode choke 240 and one or more capacitors. The combination of common mode choke 240 and one or more capacitors may have a dimension of, for example and not limited thereto, 21.16 mm×15.8 mm, and this compact form factor is also critical to achieving the overall length of the SFP module to be shortened to a desired dimension, e.g., 70 mm.

SFP connector 250 may be configured to interface and communicate with a host platform upon the SFP module being plugged into the host platform.

Figure 3:
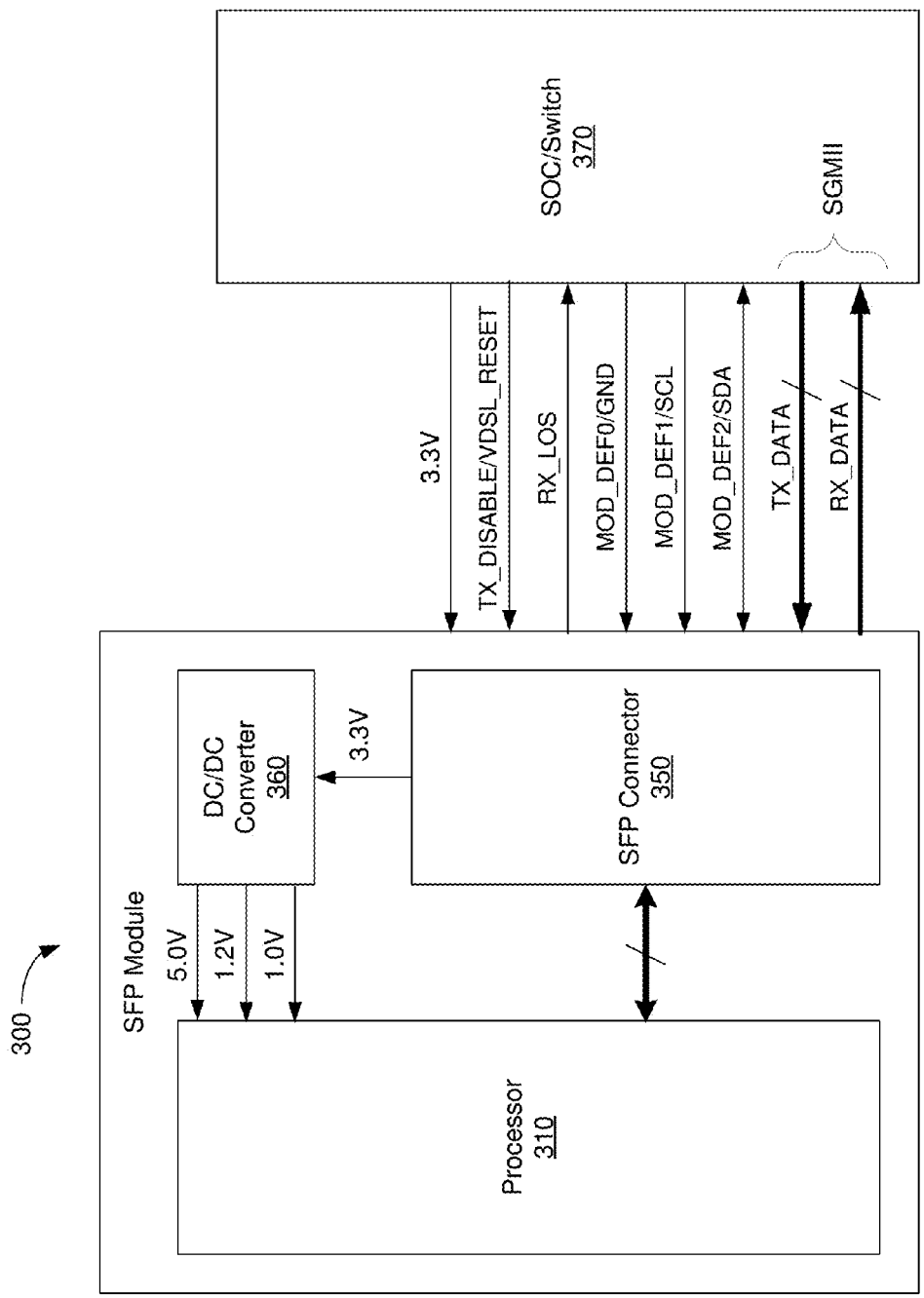
FIG. 3 is a schematic diagram of an example SFP module in accordance with an embodiment of the present disclosure.

FIG. 3 illustrates an example SFP module 300 in accordance with an embodiment of the present disclosure. SFP module 300 may be a swappable broadband access SFP transceiver such as a VDSL2/G.Fast transceiver. For simplicity, only select few and not all components of SFP module 300 are shown in FIG. 3. That is, SFP module 300 includes at least those components shown in FIG. 3 and additional components that are not shown.

SFP module 300 may include a processor 310 and a SFP connector 350, which may be similar or identical to processor 210 and SFP connector 250, respectively. SFP module 300 may also include a direct current (DC)-to-DC converter 360 configured to convert a DC voltage (e.g., 3.3V) from SFP connector 350 to another DC voltage (e.g., 5.0V, 1.2V or 1.0V) to processor 310.

SFP module 300 may be communicatively and electrically coupled to a system-on-chip (SOC)/switch 370. The SOC/switch 370 may be, for example, an Ethernet switch such as Ethernet switch 120. SFP module 300 may include a number of pins configured to transmission of signal, data and electric power between SFP module 300 and SOC/switch 370. In the example shown in FIG. 3, SFP module 350 of SFP module 300 may receive, from SOC/switch 370 a 3.3-volt DC power, a transmit disable signal (TX_DISABLE), a VDSL reset signal (VDSL_RESET), a module definition 0 and/or ground signal (MOD_DEF0/GND), a module definition 1 and/or serial clock line signal (MOD_DEF1/SCL), a module definition 2 and/or serial data line signal (MOD_DEF2/SDA) and transmit data (TX_DATA). Conversely, SFP connector 350 of SFP module 300 may transmit a receive loss-of-signal signal (RX_LOS) and receive data (RX_DATA) to SOC/switch 370. The pins for SCL and SDA are so-called inter-integrated circuit (I2C) interface. The I2C pins, MOD_DEF1/SCL and MOD_DEF2/SDA, can be applied for additional features for NTR/ToD usage. The pins for TX_DATA and RX_DATA are for SGMII.

Figure 4:
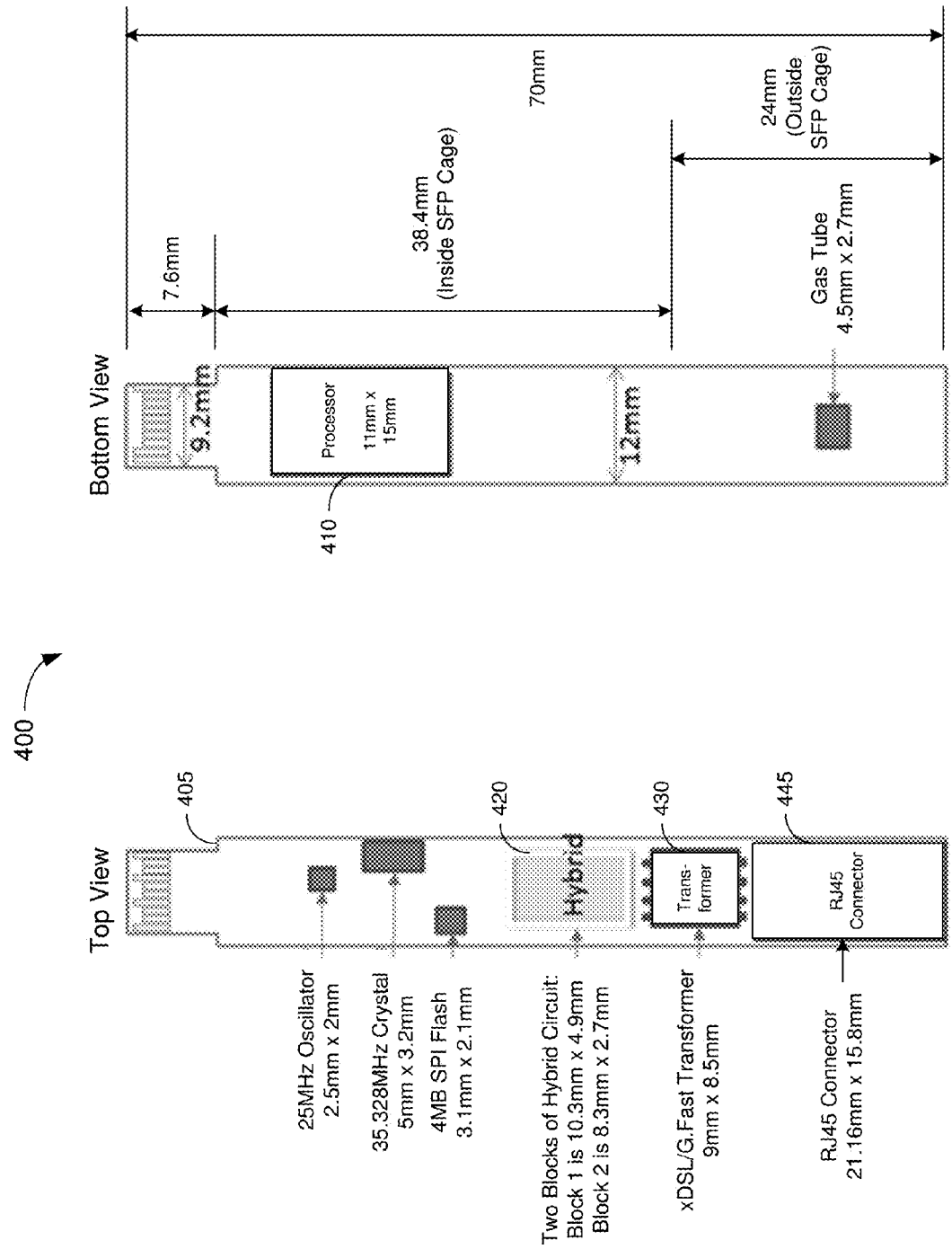
FIG. 4 is a diagram of various views of a PCB layout of an example SFP module in accordance with an embodiment of the present disclosure.
Figure 5:
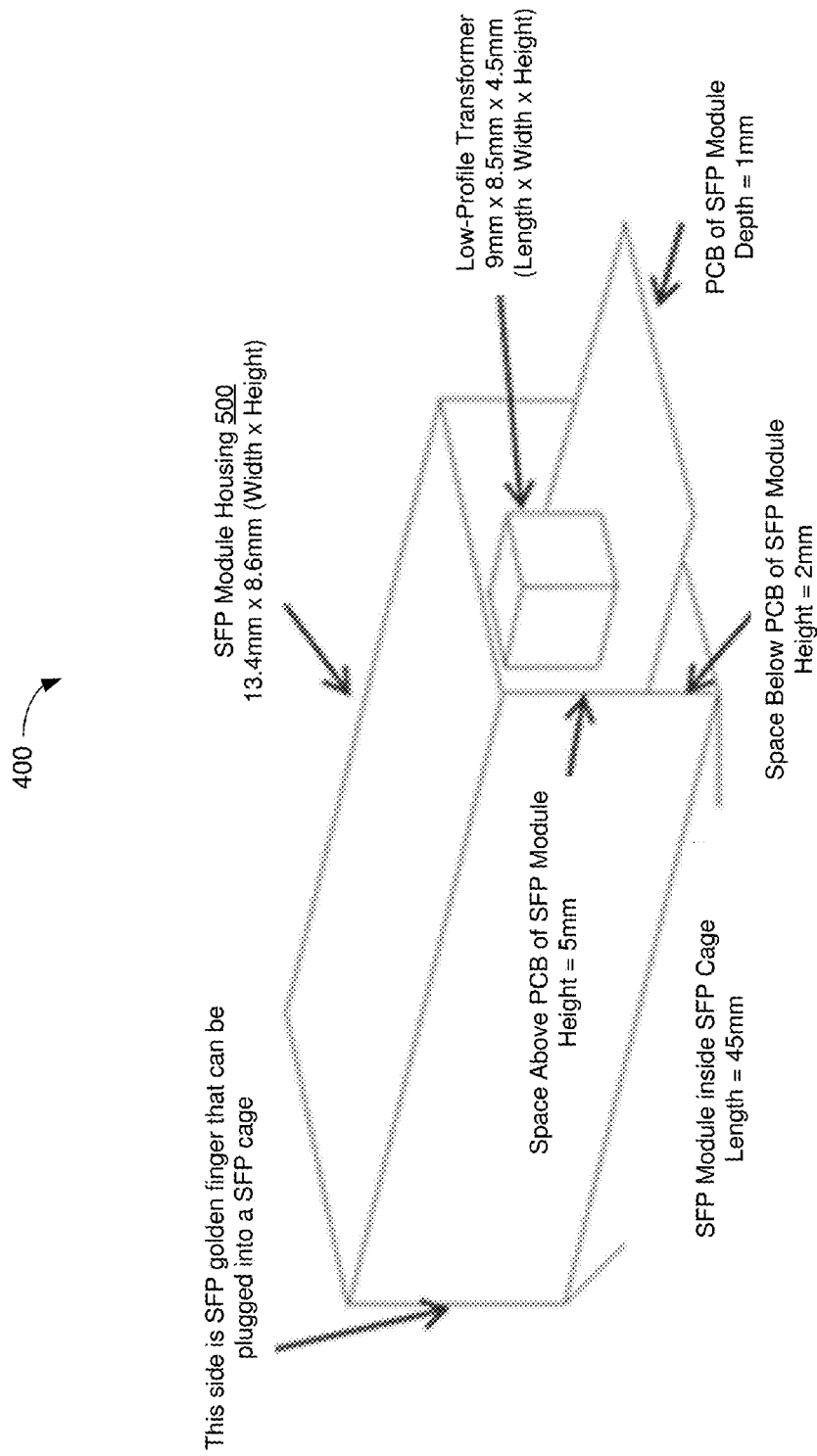
FIG. 5 is a diagram of a perspective view of a housing of an example SFP module in accordance with an embodiment of the present disclosure.

FIG. 4 illustrates a top view and a bottom view of a PCB layout of an example SFP module 400 in accordance with an embodiment of the present disclosure. FIG. 5 illustrates a perspective view of a housing 500 of example SFP module 400 in accordance with an embodiment of the present disclosure. SFP module 400 may be a swappable broadband access SFP transceiver such as a VDSL2/G.Fast transceiver. In FIG. 4, a top side (in top view) as well as a bottom side (in bottom view) of a PCB 405 of a SFP module 400 is shown. In the example shown in FIG. 4, a number of components may be mounted on the top side of PCB 405 including, for example, a hybrid circuit 420, a transformer 430 and a RJ45 connector 445. Hybrid circuit 420, transformer 430 and RJ connector 445 may be similar or identical to hybrid circuit 220, transformer 230 and RJ connector 245, respectively. Other components mounted on the top side of PCB 405 may include an oscillator (e.g., 25 MHz oscillator), a crystal (e.g., 35.328 MHz crystal) and a serial peripheral interface (SPI) flash memory (e.g., 4 MB SPI flash memory). A number of components may be also mounted on the bottom side of PCB 405 including, for example, a processor 410 and a gas tube. Processor 410 may be similar or identical to processor 210.

Example dimensions of each of these components are shown in FIG. 4, and example dimensions of housing 500 of SFP module 400 is shown in FIG. 5. In the example shown in FIG. 4 and FIG. 5, the overall length of PCB 405 (as well as SFP module 400) is 70 mm. Of the 70 mm overall length, 7.6 mm is designed to be inserted into a SFP connector, 38.4 mm is designed to be inside a SFP cage and 24 mm is designed to be outside of the SFP cage.

Figure 6:
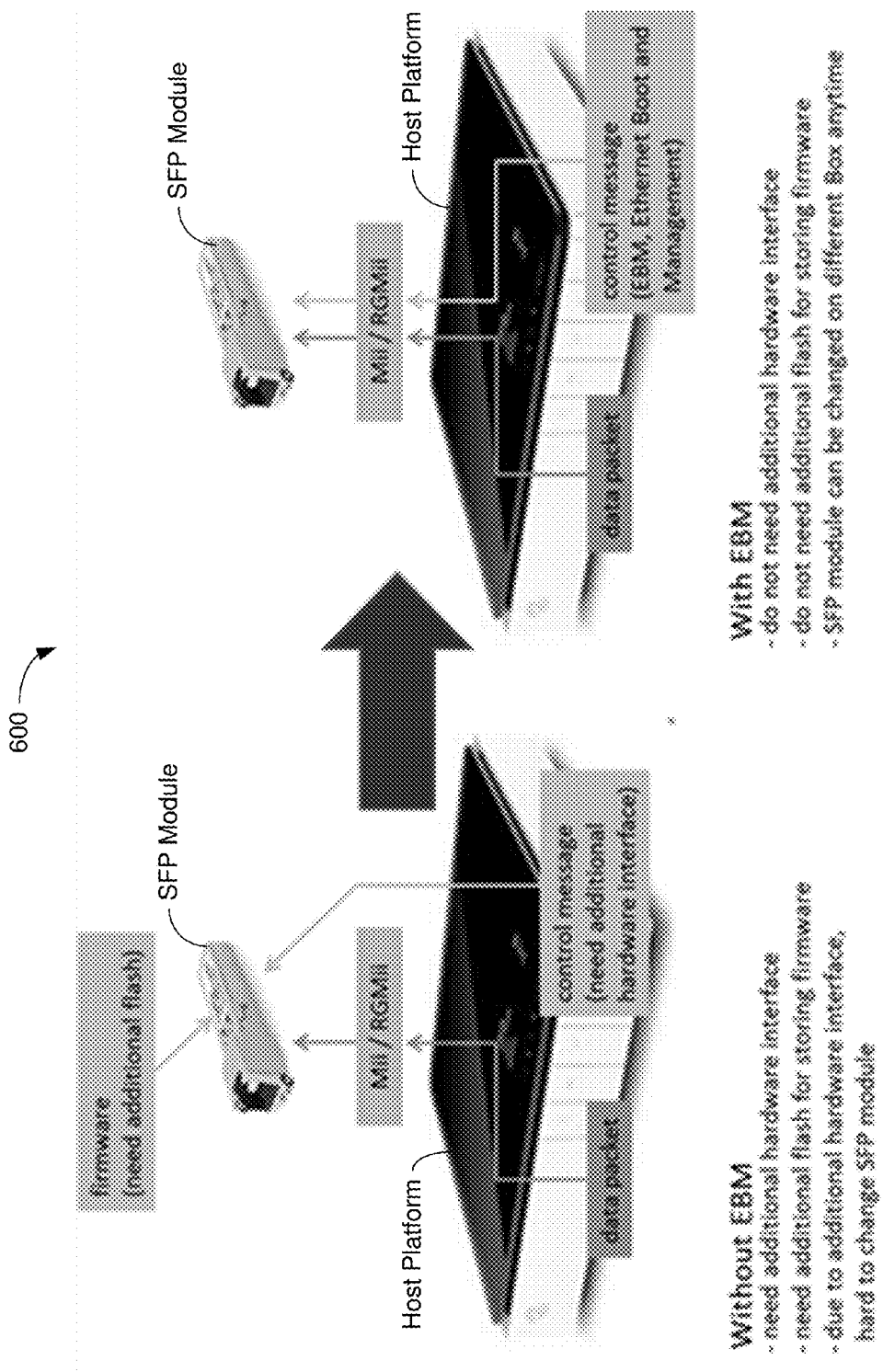
FIG. 6 is a diagram of example management scenarios in accordance with an embodiment of the present disclosure.

FIG. 6 illustrates example management scenarios 600 in accordance with an embodiment of the present disclosure. Scenarios 600 depict how to control a VDSL2/G.Fast SFP module using a protocol (herein referred to as Ethernet Boot and Management (EBM) protocol) through SerDes interface by exchanging in-band Ethernet packets. The EBM protocol allows a SFP module in accordance with the present disclosure to be used on existing host platforms having a SFP connector without the need to modify the hardware of the existing devices. What is needed is software upgrade on the host platform in order for the host platform to control the VDSL2/G.Fast SFP module through the EBM protocol. In some implementations, public and private VDSL2/G.Fast management information base (MIB) may be accessed through the EBM protocol.

As shown in FIG. 6, without the EBM protocol, additional hardware interface and additional flash memory for firmware storage would be required. However, given the requirement of additional hardware interface, it would be difficult to change the SFP module. Also shown in FIG. 6, with the EBM protocol, there is no need for any additional hardware interface or flash memory. The SFP module may be changed on different host platforms at any time. Moreover, standard SFP-8472 multi-source agreement management can be supported through the I2C interface of the SFP module.

In some implementations, the SFP module in accordance with the present disclosure may support a number of booting modes. For instance, the SFP module may support three booting modes to boot up the SFP module, including a first booting mode (e.g., flash booting mode), a second booting mode (e.g., I2C booting mode) and a third booting mode (e.g., EBM booting mode). The processor (e.g., processor 210, processor 310 or processor 410) of the SFP module may include a built-in bootrom which can respond to boot strap pins and act accordingly.

For the first booting mode, the SFP module may have an optional SPI flash memory on board, and the SPI flash memory may be connected to the processor of the SFP module through an SPI interface. The SPI flash memory may store a modem code so that the processor may load the modem code into a built-in synchronous dynamic random-access memory (SDRAM) of the processor automatically when the SFP module is plugged into a host platform when the first booting mode is chosen.

In the second booting mode, an I2C protocol may be utilized to boot up the SFP module once the SFP module is plugged into a host platform. A host platform software driver may first detect the SFP module and exchange information with the SFP module. Upon the SFP module indicating that it is waiting for booting through I2C, the software driver may feed a modem code to the SFP module through the I2C interface for booting.

In the third booting mode, a host platform software driver may first detect the SFP module and exchange information with the SFP module. Upon the SFP module indicating that it is waiting for booting through EBM, the software driver may feed a modem code to the SFP module through the EBM protocol. EBM booting may require less time compared to I2C booting. For example, the boot time in the third booting mode through the EBM protocol may be about 1.3 seconds.

Figure 7:
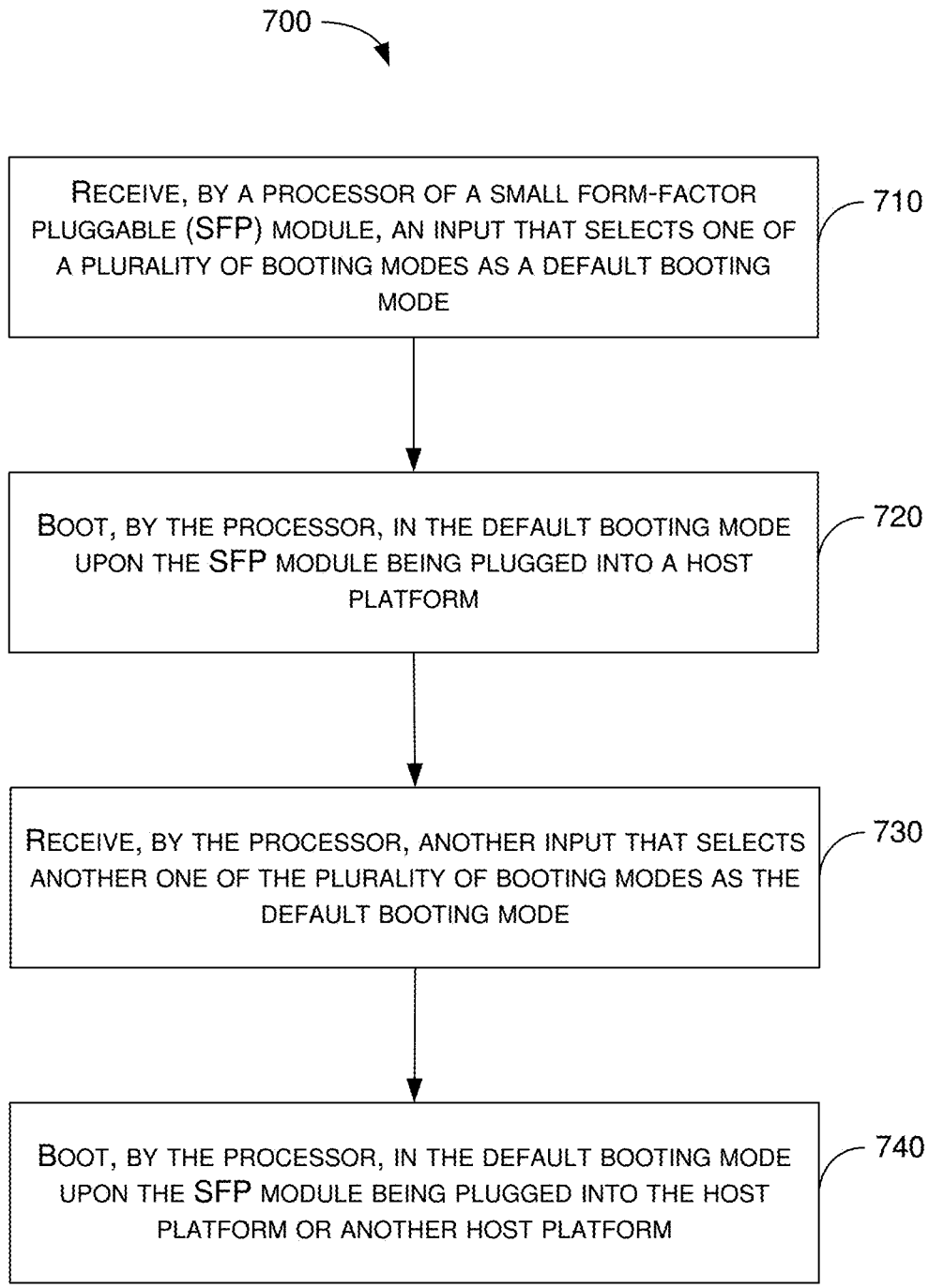
FIG. 7 is a flowchart of an example process in accordance with an embodiment of the present disclosure.

FIG. 7 is a flowchart of an example process 700 in accordance with an embodiment of the present disclosure. Process 700 may include one or more operations, actions, or functions as represented by one or more of blocks 710, 720, 730 and 740. Although illustrated as discrete blocks, various blocks of process 700 may be divided into additional blocks, combined into fewer blocks, or eliminated, depending on the desired implementation. The blocks of process 700 may be performed in the order shown in FIG. 7 or in any other order, depending on the desired implementation. Process 700 may be implemented by SFP module 150, SFP module 200, SFP module 300 and SFP module 400. Solely for illustrative purpose and without limiting the scope of the present disclosure, process 700 is described below in the context of SFP module 200. Process 700 may begin at 710.

At 710, process 700 may involve processor 210 of SFP module 200 receiving an input (e.g., user input) that selects one of a plurality of booting modes as a default booting mode. Process 700 may proceed from 710 to 720.

At 720, process 700 may involve processor 210 of SFP module 200 booting SFP module 200 in the default booting mode upon SFP module 200 being plugged into a host platform. Process 700 may proceed from 720 to 730.

At 730, process 700 may involve processor 210 of SFP module 200 receiving another input that selects another one of the plurality of booting modes as the default booting mode. Process 700 may proceed from 730 to 740.

At 740, process 700 may involve processor 210 of SFP module 200 booting SFP module 200 in the default booting mode upon SFP module 200 being plugged into the host platform or another host platform.

In some implementations, SFP module 200 may be a transceiver configured to support communication according to the VDSL technology (e.g., VDSL2).

In some implementations, SFP module 200 may be a transceiver configured to support communication according to the G.Fast standard.

In some implementations, in receiving the input that selects one of the plurality of booting modes as the default booting mode, process 700 may involve processor 210 receiving the input that selects a flash booting mode as the default booting mode. Accordingly, in booting in the default booting mode, process 700 may involve processor 210 loading a modem code from a flash memory of SFP module 200 into a built-in memory of processor 210 upon SFP module 200 being plugged into the host platform. Process 700 may also involve processor 210 booting SFP module 200 according to the modem code.

In some implementations, in receiving the input that selects one of the plurality of booting modes as the default booting mode, process 700 may involve processor 210 receiving the input that selects an I2C booting mode as the default booting mode. Accordingly, in booting in the default booting mode, process 700 may involve processor 210 exchanging information through an I2C protocol with a software driver of the host platform upon SFP module 200 being plugged into the host platform to report to the software driver that SFP module 200 is waiting for booting. Process 700 may also involve processor 210 receiving a modem code from the software driver through an I2C interface. Process 700 may further involve processor 210 booting SFP module 200 according to the modem code.

In some implementations, in receiving the input that selects one of the plurality of booting modes as the default booting mode, process 700 may involve processor 210 receiving the input that selects an EBM booting mode as the default booting mode. Accordingly, in booting in the default booting mode, process 700 may involve processor 210 exchanging information through an EBM protocol with a software driver of the host platform upon SFP module 200 being plugged into the host platform to report to the software driver that SFP module 200 is waiting for booting. Process 700 may also involve processor 210 receiving a modem code from the software driver through a SerDes interface. Process 700 may further involve processor 210 booting SFP module 200 according to the modem code.

CONCLUSION AND ADDITIONAL NOTES

In view of the above, a transceiver in accordance with the present disclosure may include a SFP module which may include a processor, a hybrid circuit, a transformer, a RJ45 connector and a SFP connector. The processor may be configured to perform functions as a SerDes, a DSP, an analog front-end and a line driver. The hybrid circuit may be configured to neutralize signals reflected from a transmit direction to a receive direction. The DSP may be configured to support communication according to the VDSL technology such as VDSL2 and G.Fast.

The SFP connector may be configured to communicate with a host platform upon the SFP module being plugged into the host platform. The SFP connector may be configured to receive from the host platform a DC power, a transmit disable signal, a VDSL reset signal, a ground signal, a SCL signal, a SDA signal and transmit data. The SFP connector may be also configured to provide to the host platform a receive loss-of-signal signal and receive data. The SFP connector may include a SGMII configured to receive the transmit data from the host platform and provide the receive data to the host platform. An overall length of the SFP module may be no more than 70 mm.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A transceiver, comprising:
a small form-factor pluggable (SFP) module that comprises:
a processor configured to perform functions as a serializer/deserializer (SerDes), a digital signal processor (DSP), an analog front-end, and a line driver;
a hybrid circuit configured to neutralize signals reflected from a transmit direction to a receive direction;
a transformer;
a RJ45 connector; and
a SFP connector.

2. The transceiver of claim 1, wherein the DSP is configured to support communication according to a Very-high-bit-rate Digital Subscriber Line (VDSL) technology.

3. The transceiver of claim 1, wherein the DSP is configured to support communication according to a G.FAST standard.

4. The transceiver of claim 1, wherein the SFP connector is configured to communicate with a host platform upon the SFP module being plugged into the host platform, wherein the SFP connector is configured to receive from the host platform a direct-current (DC) power, a transmit disable signal, a Very-high-bit-rate Digital Subscriber Line (VDSL) reset signal, a ground signal, a serial clock line (SCL) signal, a serial data line (SDA) signal and transmit data, and wherein the SFP connector is configured to provide to the host platform a receive loss-of-signal signal and receive data.

5. The transceiver of claim 4, wherein the SFP connector comprises a Serial Gigabit Media Independent interface (SGMII) configured to receive the transmit data from the host platform and provide the receive data to the host platform.

6. The transceiver of claim 1, wherein an overall length of the SFP module is no more than 70 mm.

7. The transceiver of claim 1, wherein the processor is configured to perform operations comprising:
receiving an input that selects one of a plurality of booting modes as a default booting mode; and
booting in the default booting mode upon the SFP module being plugged into a host platform.

8. The transceiver of claim 7, wherein, in receiving the input that selects one of the plurality of booting modes as the default booting mode, the processor is configured to receive the input that selects a flash booting mode as the default booting mode, and wherein, in booting in the default booting mode, the processor is configured to perform operations comprising:
loading a modem code from a flash memory into a built-in memory upon the SFP module being plugged into the host platform; and
booting according to the modem code.

9. The transceiver of claim 7, wherein, in receiving the input that selects one of the plurality of booting modes as the default booting mode, the processor is configured to receive the input that selects an inter-integrated circuit (I2C) booting mode as the default booting mode, and wherein, in booting in the default booting mode, the processor is configured to perform operations comprising:
exchanging information through an I2C protocol with a software driver of the host platform upon the SFP module being plugged into the host platform to report to the software driver that the SFP module is waiting for booting;
receiving a modem code from the software driver through an I2C interface; and
booting according to the modem code.

10. The transceiver of claim 7, wherein, in receiving the input that selects one of the plurality of booting modes as the default booting mode, the processor is configured to receive the input that selects an Ethernet boot and management (EBM) booting mode as the default booting mode, and wherein, in booting in the default booting mode, the processor is configured to perform operations comprising:
exchanging information through an EBM protocol with a software driver of the host platform upon the SFP module being plugged into the host platform to report to the software driver that the SFP module is waiting for booting;
receiving a modem code from the software driver through a SerDes interface; and
booting according to the modem code.

11. The transceiver of claim 7, wherein the processor is further configured to perform operations comprising:

receiving another input that selects another one of the plurality of booting modes as the default booting mode; and booting in the default booting mode upon the SFP module being plugged into the host platform or another host platform.

12. A method, comprising:

receiving, by a processor capable of xDSL/G.FAST modulation and demodulation and inside a non-optical small form-factor pluggable (SFP) module, an input that selects one of a plurality of booting modes as a default booting mode; and booting, by the processor, in the default booting mode upon the SFP module being plugged into a host platform.

13. The method of claim 12, wherein the SFP module comprises a transceiver configured to support communication according to a Very-high-bit-rate Digital Subscriber Line (VDSL) technology.

14. The method of claim 12, wherein the SFP module comprises a transceiver configured to support communication according to a G.FAST standard.

15. The method of claim 12, wherein the receiving of the input that selects one of the plurality of booting modes as the default booting mode comprises receiving the input that selects a flash booting mode as the default booting mode, and wherein the booting in the default booting mode comprises:

loading, by the processor, a modem code from a flash memory into a built-in memory upon the SFP module being plugged into the host platform; and booting, by the processor, according to the modem code.

16. The method of claim 12, wherein the receiving of the input that selects one of the plurality of booting modes as the default booting mode comprises receiving the input that selects an inter-integrated circuit (I2C) booting mode as the default booting mode, and wherein the booting in the default booting mode comprises:

exchanging, by the processor, information through an I2C protocol with a software driver of the host platform upon the SFP module being plugged into the host platform to report to the software driver that the SFP module is waiting for booting;

receiving, by the processor, a modem code from the software driver through an I2C interface; and booting, by the processor, according to the modem code.

17. The method of claim 12, wherein the receiving of the input that selects one of the plurality of booting modes as the default booting mode comprises receiving the input that selects an Ethernet boot and management (EBM) booting mode as the default booting mode, and wherein the booting in the default booting mode comprises:

exchanging, by the processor, information through an EBM protocol with a software driver of the host platform upon the SFP module being plugged into the host platform to report to the software driver that the SFP module is waiting for booting;

receiving, by the processor, a modem code from the software driver through a serializer/deserializer (SerDes) interface; and booting, by the processor, according to the modem code.

18. The method of claim 12, further comprising:

receiving, by the processor, another input that selects another one of the plurality of booting modes as the default booting mode; and booting, by the processor, in the default booting mode upon the SFP module being plugged into the host platform or another host platform.

* * * * *